US012574737B2

(12) United States Patent
Sankar Mantha et al.

(10) Patent No.: US 12,574,737 B2
(45) Date of Patent: Mar. 10, 2026

(54) METHODS FOR PROTECTING 5G CORE NETWORKS FROM ATTACKS

(71) Applicant: F5, Inc., Seattle, WA (US)

(72) Inventors: Ravi Sankar Mantha, Bangalore (IN);
Sandeep Dasgupta, Bangalore (IN)

(73) Assignee: F5, Inc., Seattle, WA (US)

( * ) Notice: Subject to any disclaimer, the term of this patent is extended or adjusted under 35 U.S.C. 154(b) by 350 days.

(21) Appl. No.: 18/373,570

(22) Filed: Sep. 27, 2023

(65) Prior Publication Data

US 2025/0106634 A1      Mar. 27, 2025

(51) Int. Cl.
*H04L 43/08*      (2022.01)
*H04L 43/0823*      (2022.01)
*H04W 12/122*      (2021.01)

(52) U.S. Cl.
CPC ....... *H04W 12/122* (2021.01); *H04L 43/0823* (2013.01)

(58) Field of Classification Search
CPC .............................. H04W 12/12; H04L 43/08
See application file for complete search history.

(56) References Cited

U.S. PATENT DOCUMENTS

| | | | |
|---|---|---|---|
| 8,893,294 B1 | 11/2014 | Steele, III | |
| 2004/0088570 A1 | 5/2004 | Roberts | |
| 2005/0114658 A1 | 5/2005 | Dye | |
| 2011/0214182 A1 | 9/2011 | Adams | |
| 2014/0298469 A1 | 10/2014 | Marion | |

(Continued)

FOREIGN PATENT DOCUMENTS

| | | |
|---|---|---|
| CN | 112 801 157 A | 5/2021 |
| CN | 113 452 707 A | 9/2021 |

(Continued)

OTHER PUBLICATIONS

R5 Networks Inc., "BIG-IP Application Security Manager: Gelling Started®", Manual, Nov. 13, 2017, 46 pages, vol. 13.1, F5 Networks, Inc., Retrieved from the Inlernet: <hllps://lechdocs.f5.com/kb/en-us/producls/big-ip_asm/manuals/producl/asm-getting-started-13-1-0 .html>.

(Continued)

*Primary Examiner* — Michael T Vu
(74) *Attorney, Agent, or Firm* — Troutman Pepper Locke LLP

(57) ABSTRACT

Methods, non-transitory computer readable media, network traffic management devices and network traffic management systems that provide protection of 5G core networks are illustrated. With this technology, the user plane status can be received from a network repository function indicating whether a user plane restarted. Then the system can determine whether an amount of error messages flowing from the user plane to a gNodeB for a source exceeds a predetermined threshold. In response to determining the amount of error messages exceeds a predetermined threshold and determining that the user plane was not restarted, all messages flowing to the gNodeB for the source can be blocked. Lastly, in response to determining the amount of echo messages from the user plane to the gNodeB is below a second predetermined threshold and that the user plane did not restart, the source can be stored as a bad actor.

20 Claims, 4 Drawing Sheets

(56) References Cited

U.S. PATENT DOCUMENTS

| | | | |
|---|---|---|---|
| 2015/0067848 A1 | 3/2015 | Baikalov | |
| 2015/0121529 A1 | 4/2015 | Quinlan | |
| 2017/0223052 A1 | 8/2017 | Stutz | |
| 2018/0020024 A1 | 1/2018 | Chao | |
| 2018/0167412 A1 | 6/2018 | Barrett | |
| 2018/0219910 A1 | 8/2018 | Greenshpan | |
| 2018/0241774 A1 | 8/2018 | Zhao | |
| 2019/0068640 A1 | 2/2019 | Araujo | |
| 2019/0087574 A1 | 3/2019 | Schmidtler | |
| 2019/0318081 A1 | 10/2019 | Gupta | |
| 2019/0334940 A1 | 10/2019 | Bar Noy | |
| 2020/0204589 A1 | 6/2020 | Strogov | |
| 2021/0232755 A1 | 7/2021 | Jadhav | |
| 2023/0015436 A1* | 1/2023 | Peitzer | H04W 36/08 |
| 2023/0422038 A1* | 12/2023 | Kolekar | H04W 12/122 |
| 2024/0314058 A1* | 9/2024 | Mueck | H04L 41/40 |

FOREIGN PATENT DOCUMENTS

| | | |
|---|---|---|
| CN | 116 419 235 A | 7/2023 |
| WO | 20230078970 A1 | 5/2023 |

OTHER PUBLICATIONS

F5 Networks Inc., "Assigning Attack Signatures to Security Policies", Manual, 2019, 6 pages, F5 Networks, Inc., Retrieved from the Internet: <hllps://lechdocs.f5.com/kb/en-us/producls/big-ip_asm/manuals/producl/big-ip-asm-attack-and-bol-signatures-14-1-0/01.hlml#guid-9e8b2b2f-1325-4 715-a879-311 c802b2e97>.

F5 Networks Inc., "BIG-IP 15.0.1 New and Installation" Release Notes, 2019, 33 pages, Version 15.0.1, F5 Networks, Inc., Retrieved from the Internet:<hllps://lechdocs.f5.com/kb/en-us/producls/big-ip_llm/releasenoles/product/relnole-bigip-15-0-1.hlml>.

Phu H. Phung, David Sands, and Andrey Chudnov; Lightweight self-protecting JavaScript. In Proceedings of the 4th International Symposium on Information, Computer, and Communications Security (ASIACCS '09). Association for Computing Machinery, New York, NY, USA, 47-60 (ACM 2009) (Year: 2009).

European Search Report. European Patent Appln No. 24202146.7 Dated Jan. 29, 2025.

F5—Enable Advanced Application Services Across Your Container Environment https://www.f5.com/products/big-ip-servic:es/container-ingress-servic:es downloaded Sep. 28, 2023.

F5—What Can BIG-IP PEM Do for You? https://www.f5.com/products/big-ip-services/polic:y-enforc:ement-manager downloaded Sep. 28, 2023.

F5—More Than Load Balancing https:t/www.f5.com/products/big-ip-seivicestlocal-traffic-manager downloaded Sep. 28, 2023.

F5—Zero Trust Begins with Secure Access to All Apps https://www.f5.corniproducts/big-ip-se1vlces/access-pollcy-manager downloaded Sep. 28, 2023.

F5—Secure Your Network from Core to Edge https://www.f5.com/products/big-ip-se1vices/advanced-firewall-manager downloaded Sep. 28, 2023.

F5—Sophisticated Attacks Require Sophisticated Solutions https://www.f5.com/products/big-ip-seivices/ddos-hybrid-defender downloaded Sep. 28, 2023.

* cited by examiner

Figure 4:
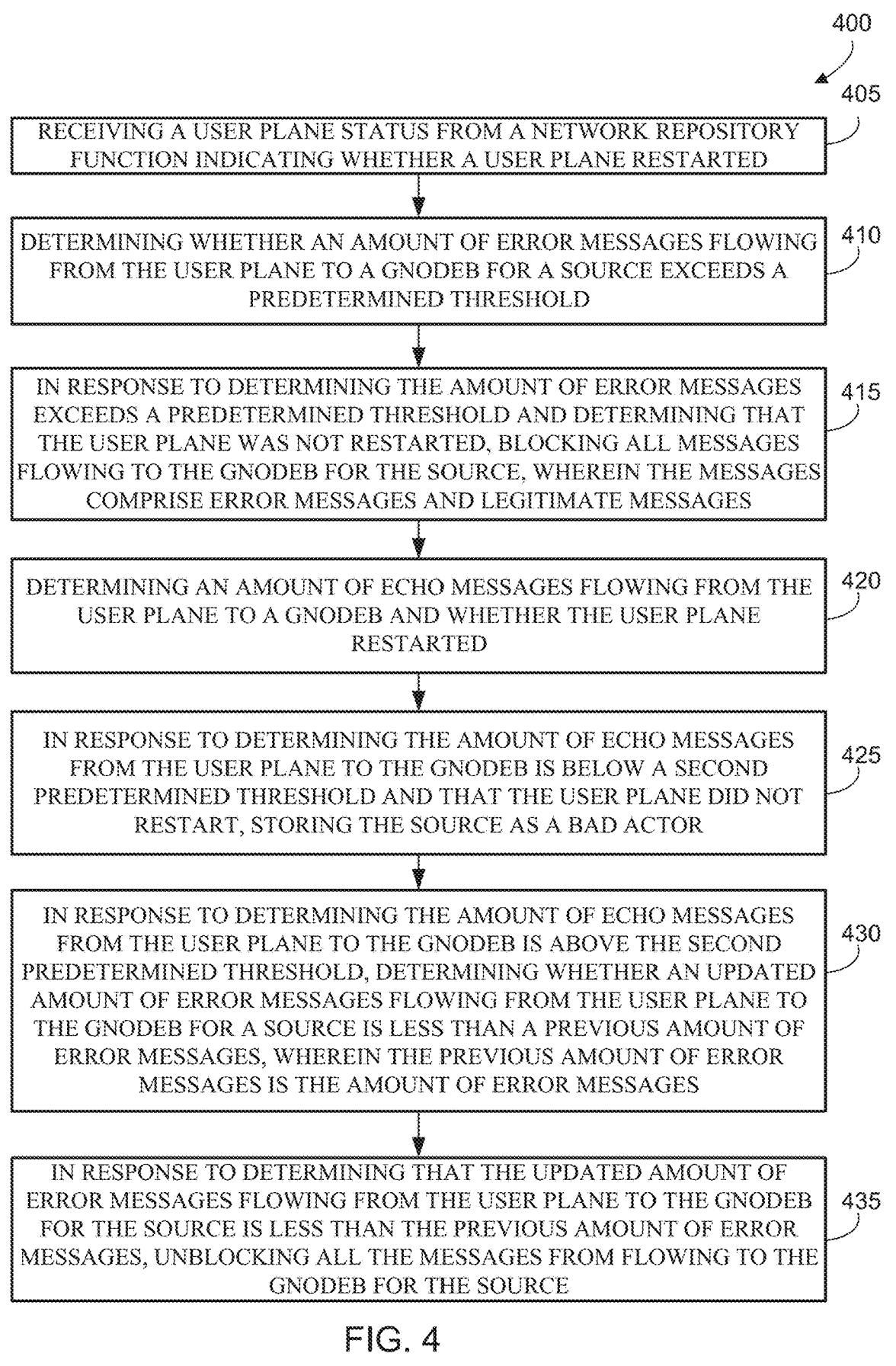

400

405

RECEIVING A USER PLANE STATUS FROM A NETWORK REPOSITORY FUNCTION INDICATING WHETHER A USER PLANE RESTARTED

DETERMINING WHETHER AN AMOUNT OF ERROR MESSAGES FLOWING FROM THE USER PLANE TO A GNODEB FOR A SOURCE EXCEEDS A PREDETERMINED THRESHOLD

410

IN RESPONSE TO DETERMINING THE AMOUNT OF ERROR MESSAGES EXCEEDS A PREDETERMINED THRESHOLD AND DETERMINING THAT THE USER PLANE WAS NOT RESTARTED, BLOCKING ALL MESSAGES FLOWING TO THE GNODEB FOR THE SOURCE, WHEREIN THE MESSAGES COMPRISE ERROR MESSAGES AND LEGITIMATE MESSAGES

415

DETERMINING AN AMOUNT OF ECHO MESSAGES FLOWING FROM THE USER PLANE TO A GNODEB AND WHETHER THE USER PLANE RESTARTED

420

IN RESPONSE TO DETERMINING THE AMOUNT OF ECHO MESSAGES FROM THE USER PLANE TO THE GNODEB IS BELOW A SECOND PREDETERMINED THRESHOLD AND THAT THE USER PLANE DID NOT RESTART, STORING THE SOURCE AS A BAD ACTOR

425

IN RESPONSE TO DETERMINING THE AMOUNT OF ECHO MESSAGES FROM THE USER PLANE TO THE GNODEB IS ABOVE THE SECOND PREDETERMINED THRESHOLD, DETERMINING WHETHER AN UPDATED AMOUNT OF ERROR MESSAGES FLOWING FROM THE USER PLANE TO THE GNODEB FOR A SOURCE IS LESS THAN A PREVIOUS AMOUNT OF ERROR MESSAGES, WHEREIN THE PREVIOUS AMOUNT OF ERROR MESSAGES IS THE AMOUNT OF ERROR MESSAGES

430

IN RESPONSE TO DETERMINING THAT THE UPDATED AMOUNT OF ERROR MESSAGES FLOWING FROM THE USER PLANE TO THE GNODEB FOR THE SOURCE IS LESS THAN THE PREVIOUS AMOUNT OF ERROR MESSAGES, UNBLOCKING ALL THE MESSAGES FROM FLOWING TO THE GNODEB FOR THE SOURCE

METHODS FOR PROTECTING 5G CORE NETWORKS FROM ATTACKS

This technology relates to methods and systems for providing protection of a 5G core network from scanning attacks.

BACKGROUND

In previous generations, mobile networks were close and secure. However, since mobile network architecture advanced to 4G, mobile networks have become vulnerable to new threat vectors and attacks. Prominent attacks on mobile networks includes an insertion of rogue evolved-next generation node Bs (e (g) NBs) into mobile networks for TEID scanning attacks. Once an attacker detects TEIDs, more sophisticated attacks can be launched which can consume network resources, user plane function resources, and gain access to a data network of the mobile network. Currently, GTP firewalls are evolving to protect mobile core networks from such attacks, but due to the introduction of new architecture (that is Control and User Plane Separation, aka CUPS) in 4G and 5G networks, these solutions remain inefficient. As a result, a new method to detect and prevent TEID scanning attacks of mobile core networks from such attacks is necessary.

SUMMARY

A method implemented by a network traffic management system that includes receiving the user plane status from a network repository function indicating whether a user plane restarted. Then the system can determine whether an amount of error messages flowing from the user plane to a gNodeB for a source exceeds a predetermined threshold. In response to determining the amount of error messages exceeds a predetermined threshold and determining that the user plane was not restarted, all messages flowing to the gNodeB for the source can be blocked. Lastly, in response to determining the amount of echo messages from the user plane to the gNodeB is below a second predetermined threshold and that the user plane did not restart, the source can be stored as a bad actor.

A network traffic management device includes a memory including programmed instructions stored thereon and one or more processors configured to be capable of executing the stored programmed instructions to receive the user plane status from a network repository function indicating whether a user plane restarted. Then the system can determine whether an amount of error messages flowing from the user plane to a gNodeB for a source exceeds a predetermined threshold. In response to determining the amount of error messages exceeds a predetermined threshold and determining that the user plane was not restarted, all messages flowing to the gNodeB for the source can be blocked. Lastly, in response to determining the amount of echo messages from the user plane to the gNodeB is below a second predetermined threshold and that the user plane did not restart, the source can be stored as a bad actor.

A non-transitory computer readable medium having stored thereon instructions for including executable code that, when executed by one or more processors, causes the processors to receive the user plane status from a network repository function indicating whether a user plane restarted. Then the system can determine whether an amount of error messages flowing from the user plane to a gNodeB for a source exceeds a predetermined threshold. In response to determining the amount of error messages exceeds a predetermined threshold and determining that the user plane was not restarted, all messages flowing to the gNodeB for the source can be blocked. Lastly, in response to determining the amount of echo messages from the user plane to the gNodeB is below a second predetermined threshold and that the user plane did not restart, the source can be stored as a bad actor.

A network traffic management system with memory comprising programmed instructions stored thereon, and one or more processors configured to be capable of executing the stored programmed instructions to receive the user plane status from a network repository function indicating whether a user plane restarted. Then the system can determine whether an amount of error messages flowing from the user plane to a gNodeB for a source exceeds a predetermined threshold. In response to determining the amount of error messages exceeds a predetermined threshold and determining that the user plane was not restarted, all messages flowing to the gNodeB for the source can be blocked. Lastly, in response to determining the amount of echo messages from the user plane to the gNodeB is below a second predetermined threshold and that the user plane did not restart, the source can be stored as a bad actor.

This technology provides a number of advantages including providing methods, non-transitory computer readable media, network traffic management devices, and network traffic management systems that can provide protection of a 5G core network by detecting and preventing scanning attacks of mobile core networks. By blocking error messages to a malicious source, the malicious source is prevented from determining whether a TEID is legitimate, which can slow an attack. This technology is able to stop a malicious source without needing to know all valid TEIDs from a control plane. By monitoring messages to the user plane and by using the network repository function subscriptions, the technology is able to protect 4G and 5G mobile network architecture more efficiently and suitably.

BRIEF DESCRIPTION OF THE DRAWINGS

FIG. 4 is a flow diagram of an exemplary method for protecting a 5G core network.

DETAILED DESCRIPTION

An example of a mobile network 10 (i.e., 5G system architecture) with a network traffic manager apparatus 24 for protecting the mobile network 10 is illustrated in FIGS. 1-4. The exemplary environment 10 includes a network traffic manager apparatus 24, a user equipment ("UE") 16, a user plane function ("UPF") 12, a control plane ("CP") 18, a data network ("DN") 20, and a next-generation node Bm ("gNodeB") 22 which are coupled together by point-to-point reference points N1-N6, although the environment can include other types and numbers of systems, devices, components, and/or elements and in other topologies and deployments. The point-to-point reference points N1-N6 can be tunneled interfaces where traffic goes through the tunnels, also known as TEIDs. While not shown, the exemplary environment 10 may include additional network components, such as functions, routers, switches, and other devices, which are well known to those of ordinary skill in the art and thus will not be described here.

Figure 1:
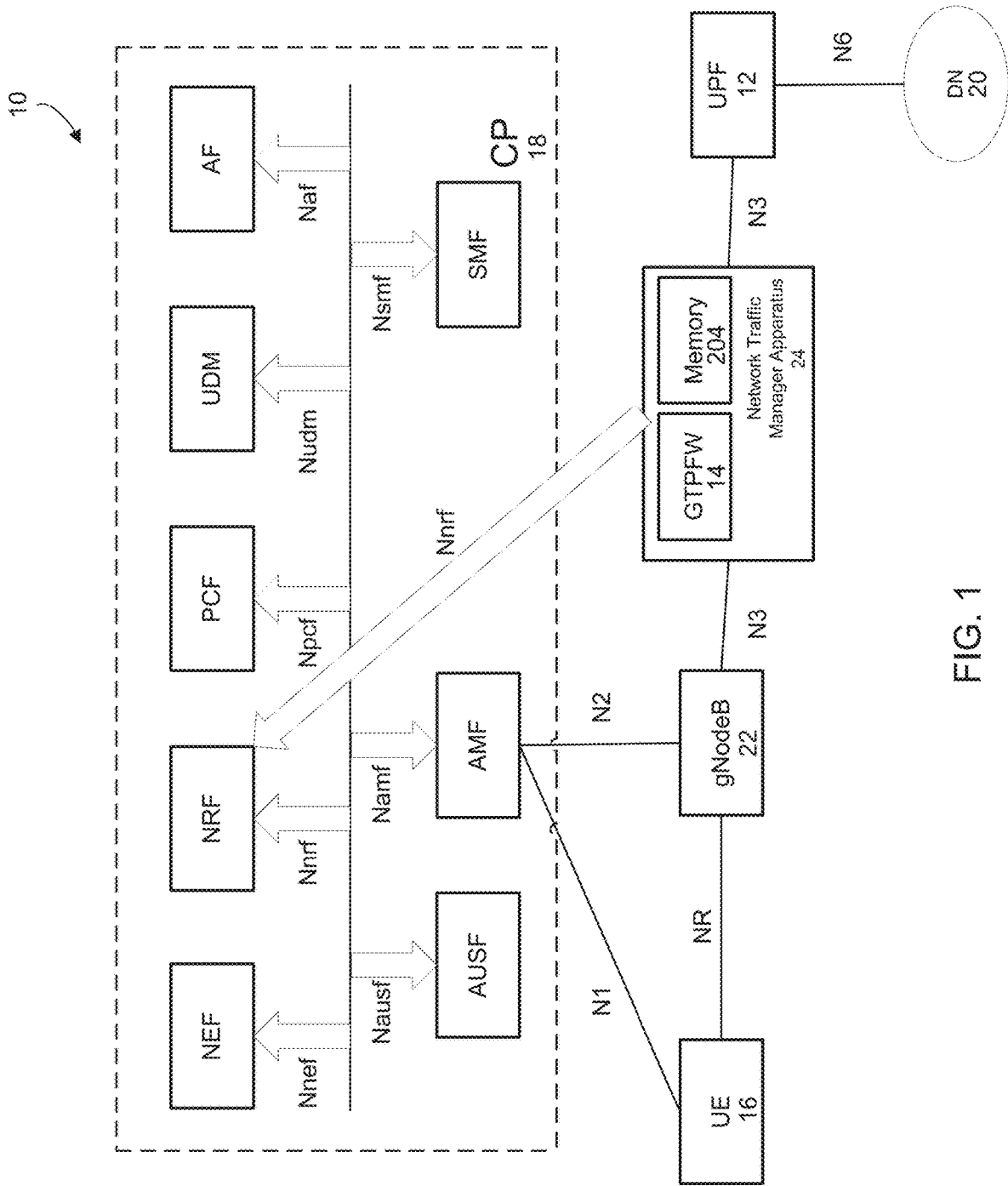
FIG. 1 is an block diagram of an exemplary 5G system architecture with a network traffic manager apparatus.

Referring to FIG. 1, an exemplary representation of a 5G Core (5GC) network system architecture 10 is shown, as defined by the 3GPP standard. As will be understood by those of ordinary skill in the art, the representation focuses on the interactions between pairs of network functions defined by point-to-point reference point (e.g., N2) between any two network functions (e.g., AMF and gNodeB 22) and is used when some interaction exists between any two network functions. As used herein, the term "network function" (NF) may refer to a component of a network infrastructure that provides a well-defined functional behavior (e.g., routing, switching, etc.). An NF may be a functional building block within a network infrastructure, which has well-defined external interfaces and a well-defined functional behavior. NFs may be a network node, a physical appliance or a software implementation of a previously physically implemented network functionality. As used herein, NF may refer to physical network functions (PNFs), virtualized network functions (VNFs), and/or to cloud-native network functions (CNFs).

Further, while the exemplary representation of a 5G Core (5GC) network system architecture 10 also includes point-to-point reference points between the NFs where necessary (e.g., see lower portion of FIG. 1), the upper portion of the figure, the 5GC Control Plane ("control plane") 18, has a bus and a service-based interface exhibited by individual function. This creates what is referred to as a Service Based Architecture (SBA), in which one CP network function (e.g., SMF) allows any other authorized NFs to access its services. Per the 3GPP standard, NFs within the control plane shall only use service-based interfaces for their instructions.

A 5G core network or mobile network 10 is made up of the following network functions: Access and Mobility Management function (AMF), Session Management function (SMF), Policy Control Function (PCF), Authentication Server Function (AUSF), Unified Data Management (UDM), Application Function (AF), Network Exposure function (NEF), Network Repository function (NRF) and the Network Slice Selection Function (NSSF). As will be appreciated by those of ordinary skill in the art, all of these NFs are well-known and are defined by the standards organization 3GPP. Nevertheless, a brief overview of some of the functionalities of each are provided herein for reference:

The AMF may support termination of NAS signaling, NAS ciphering and integrity protection, registration management, connection management, mobility management, access authentication and authorization and security context management.

The UPF 12 may support packet routing and forwarding, packet inspection, QoS handling, acts as external PDU session point of interconnect to the data network ("DN") 20 and is an anchor point for intra- and inter-RAT mobility.

The SMF may support session management (e.g., session establishment, modification and release), UE 16 IP address allocation and management, DHCP functions, termination of NAS signaling related to session management, DL data notification and traffic steering configuration for UPF 12 for proper traffic routing.

The PCF may support unified policy framework, providing policy rules to CP functions and access subscription information for policy decisions in UDR.

The AUSF may act as an authentication server.

The UDM may support generation of Authentication and Key Agreement (AKA) credentials, user identification handling, access authorization and subscription management.

The AF may support application influence on traffic routing, accessing NEF, and interaction with policy framework for policy control.

The NEF may support exposure of capabilities and events, secure provision of information from external application to 3GPP network and translation of internal/external information.

The NRF may support service discovery function and maintains NF profile and available NF instances.

The NSSF may support selecting of the Network Slice instances to serve the UE 16, determining the allowed NSSAI, determining the AMF set to be used to serve the UE 16.

As will be understood by those of ordinary skill in the art, as further depicted in FIG. 1, a user equipment (UE) 16 device (e.g., a smartphone) may access the 5G Core network by connecting to a Radio Access Network (R(AN)) or a gNodeB 22 (e.g., a cellular network), and may ultimately access an external data network (DN) 20 through a user plane function (UPF) 12. The 5G architecture also may include other network devices such as routers or switches, for example, which are known in the art and thus will not be described herein.

A "client," 16 "client device," 16 "user equipment" 16 and/or "user equipment device" 16 refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers. User equipment may be any device that is used directly by an end-user to communicate with a network and may include devices such as, for example, hand-held telephones, smartphones, laptop computers equipped with a mobile broadband adapter, or any other such device that is capable of connecting to a radio access network (RAN), Wi-Fi network, or any other such network. Although FIG. 1 only depicts a single UE 16 and singular NFs (e.g., AMF, SMF, etc.), it should be understood that it is contemplated that the system architecture may include many of each. For example, there may be many UEs 16 that communicate with the gNodeB 22.

The UE 16 of the 5G network architecture 10 in this example include any type of computing device that can exchange network data, such as mobile, desktop, laptop, or tablet computing devices, virtual machines (including cloud-based computers), or the like. Each of the UE devices includes a processor, a memory, and a communication interface, which are coupled together by a bus or other communication link (not illustrated), although other numbers or types of components could also be used.

The UE 16 devices may run interface applications, such as standard web browsers or standalone client applications. The interface applications may provide an interface to make requests for, and receive content stored on, one or more of server devices that are part of the data network (DN). The UE devices may further include a display device, such as a display screen or touchscreen, or an input device, such as a keyboard for example (not illustrated).

A data network (DN) 22 or "server" (also referred to as a "server system" or "server computer system") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients. The user equipment (UE) may access the 5G Core network of the control plane 18 by connecting to a Radio Access Network (R(AN)) or a gNodeB 22 (e.g., a cellular network), and may ultimately access an external data network (DN) 20.

A gNodeB 22 is a node in a cellular network that provides connectivity between user equipment 16 and the AMF or UPF 12. The gNodeB 22 is the functional equivalent of a base station in a traditional cellular network and is responsible for radio communication with UEs 16 in its coverage area, known as a cell. A gNodeB 22 may be a physical entity, such as a tower, or it may be a virtual entity, such as a software defined radio (SDR). The gNodeB 22 can assist in radio resource management, mobility management, connection management, security, quality of service, charging, or combinations thereof.

The communication interface of the mobile network 10 operatively couples and communicates between the network traffic manager apparatus 24, various NFs, such as for example, AMF, SMF, UDM, AF, PCF, NRF, AUSF and NEF and further allows communication to UE 16, gNodeB 22, UPF 12 and DN 20 as shown in, for example, FIG. 1. According to some examples, some or all of the NFs may be executed as software on a single device that may be configured to allow communication between NFs. According to some examples, the communication interface 206 may be coupled to a communication network(s) that allow for communication with NFs that may be located on a separate device than the UPF 12 as well as other external devices such as UE 16, gNodeB 22 and DN 20.

By way of example only, the communication network(s) can include local area network(s) (LAN(s)) or wide area network(s) (WAN(s)), and can use TCP/IP over Ethernet and industry-standard protocols, although other types or numbers of protocols or communication networks can be used. The communication network(s) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The UPF 12 may include a GPRS tunneling protocol firewall (GTPFW) 14. The GTPFW 14 can monitor and control all traffic from the gNodeB 22 and ensure that all traffic is coming from verified sources and meets all necessary credentials to prevent interception and other attacks. The GTPFW 14 can provide full control over the signalling stack and can require no network configuration on PS nodes. The GTPFW 14 can be deployed standalone or can be complemented with additional protocols as additional modules as needed.

Figure 2:
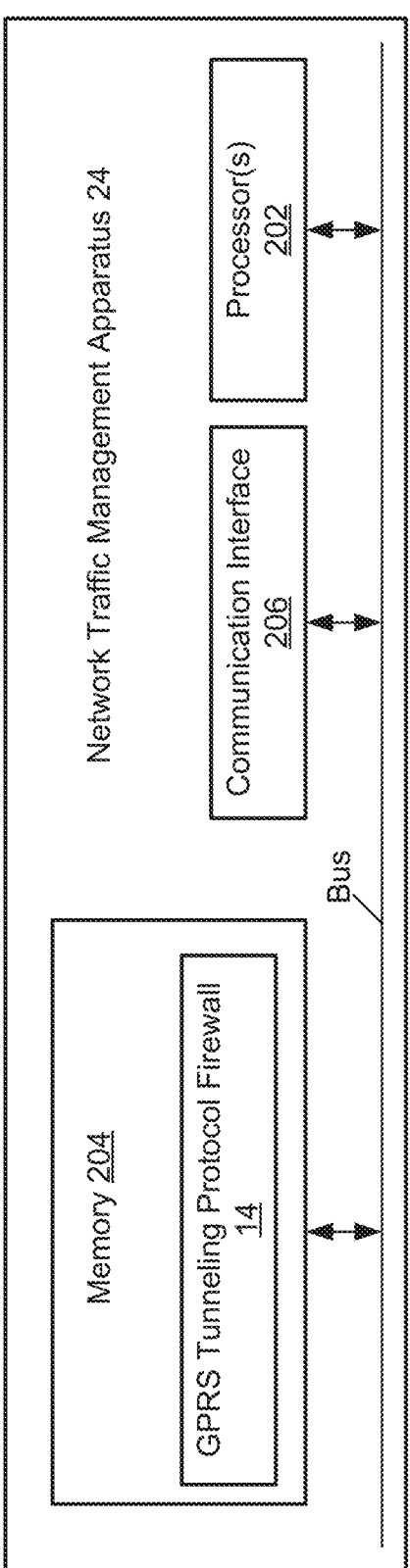
FIG. 2 is an exemplary network traffic management apparatus configured for protecting a 5G core network.
Figure 3:
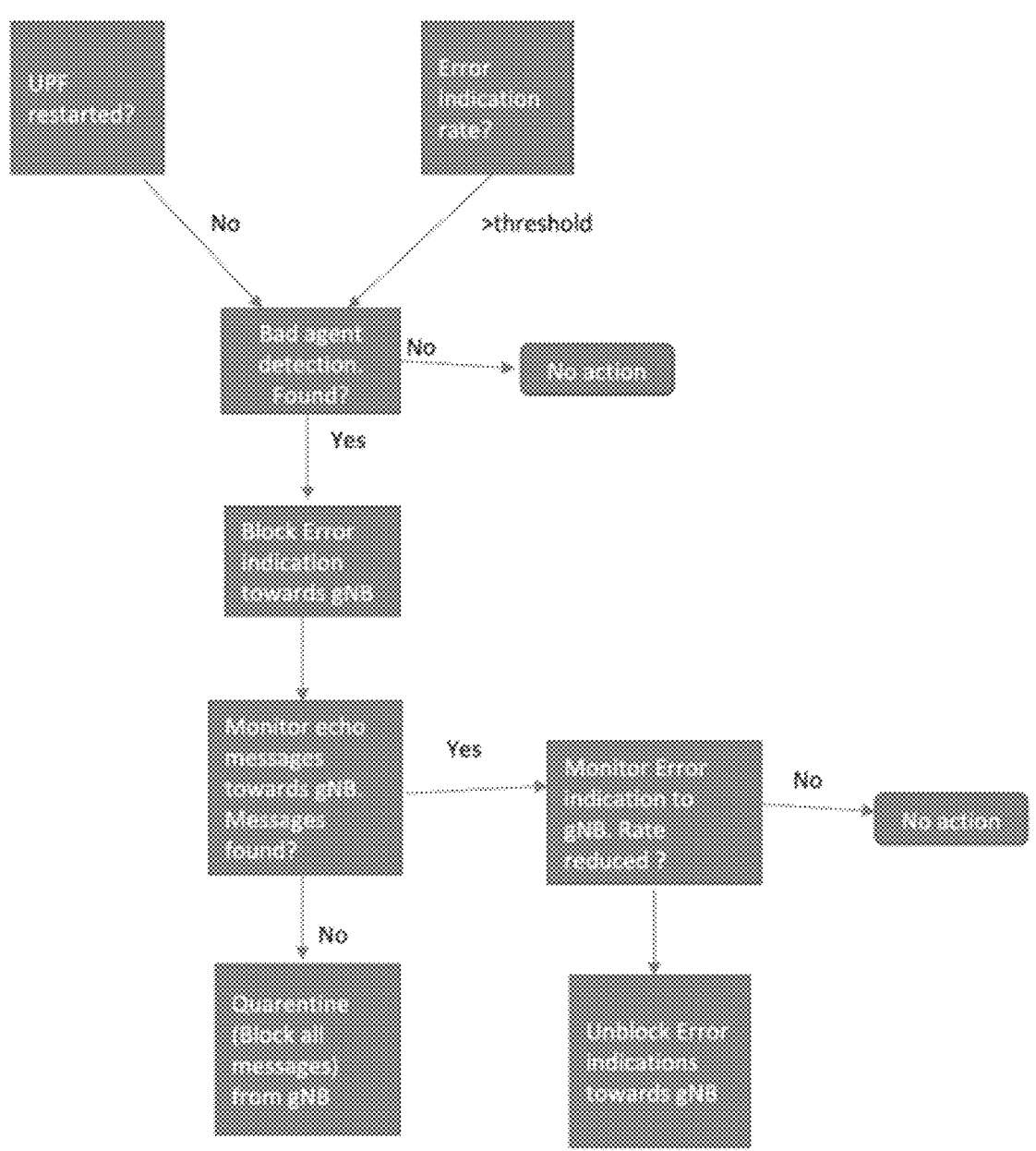
FIG. 3 is an illustration of an exemplary flow for protecting a 5G core network.

Referring to FIGS. 1 and 2, a network traffic manager apparatus 24 may perform any number of functions, such as providing protection within a 5G core network as described herein. The network traffic manager apparatus 24 in this example includes processor(s) 202, a memory 204, and a communication interface 206, which are coupled together by a bus, although the network traffic manager apparatus 24 can include other types or numbers of elements in other configurations. The network traffic manager apparatus 24 does not have any standard 3GPP nodes exposed to other 3GPP nodes (N1, N2, etc.). The network traffic manager apparatus 24 can be collocated to the UPF 12 or can sit between the gNodeB 22 and the UPF 12 as illustrated in FIG. 1 to intercept all N3 interface traffic. In some examples, the network traffic manager apparatus 24 can be interfaced with NRF (Nnrf) to register for UPF 12 events in case it is not collocated with UPF 12. Further, although the network traffic manager apparatus 24 is described herein as a device, it should be understood that in some examples, the network traffic manager apparatus 24 may be virtualized and some or all of the functionalities of network traffic manager apparatus 24 described herein may be embodied in the form of software.

The processor(s) 202 of the network traffic manager apparatus 24 may execute programmed instructions stored in the memory 204 of the network traffic manager apparatus 24 for any number of functions described and illustrated herein. The processor(s) 202 of network traffic manager apparatus 24 may include one or more central processing units (CPUs) or general purpose processors with one or more processing cores, for example, although other types of processor(s) can also be used.

The memory 204 of the network traffic manager apparatus 24 stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s), can be used for the memory.

Accordingly, the memory of the network traffic manager apparatus 24 can store one or more modules that can include computer executable instructions that, when executed by the network traffic manager apparatus 24, cause network traffic manager apparatus 24 to perform actions, such as to transmit, receive, or otherwise process network messages, for example, and to perform other actions described and illustrated below with reference to FIGS. 1-4. The modules can be implemented as components of other modules. Further, the modules can be implemented as applications, software programs, operating system extensions, plugins, or the like.

While the network traffic manager apparatus 24 is illustrated in this example as including a single device, the network traffic manager apparatus 24 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the mobile network 10.

Additionally, one or more of the devices that together comprise the network traffic manager apparatus 24 in other examples can be standalone devices or integrated with one or more other devices or apparatuses, such as one or more server devices, for example. Moreover, one or more of the devices of the network traffic manager apparatus 24 in these examples can be in a same or a different communication network including one or more public, private, or cloud networks, for example.

Although network traffic manager apparatus 24 is illustrated as single device, one or more actions of each of the network traffic manager apparatus 24 may be distributed across one or more distinct network computing devices that together comprise one or more of the network traffic manager apparatus 24. Moreover, the network traffic manager apparatus 24 is not limited to a particular configuration. Thus, the network traffic manager apparatus 24 may contain network computing devices that operate using a master/slave approach, whereby one of the network computing devices of the network traffic manager apparatus 24 operate to manage or otherwise coordinate operations of the other network computing devices. The network traffic manager apparatus 24 may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, in some examples, one or more of the modules of the network traffic manager apparatus 24 may be an integrated software component of an a device such as an network traffic manager apparatus 24. In some examples, one or more of the modules of the network traffic manager apparatus 24 may be run as a separate container in a cloud-based deployment and may interact with the network traffic manager apparatus 24, or any other NFs.

Even further, the modules may be operative in a cloud-based computing environment. The modules can be executed within or as virtual machine(s) or virtual server(s) that may be managed in a cloud-based computing environment. Also, the modules, and even the network traffic manager apparatus 24 itself, may be located in virtual server(s) running in a cloud-based computing environment rather than being tied to one or more specific physical network computing devices. Also, the modules may be running in one or more VMs executing on the security server device. Additionally, in one or more examples of this technology, virtual machine(s) running on the network traffic manager apparatus 24 may be managed or supervised by a hypervisor.

Although the exemplary 5G system architecture with the network traffic manager apparatus 24, UE device 16, gNodeB 22, DN 20 and various NFs are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the 5G system architecture 10, such as the network traffic manager apparatus 24 and various NFs, for example, may be configured to operate as virtual instances on the same physical machine. In other words, one or more of the network traffic manager apparatus 24 and various NFs may operate on the same physical device rather than as separate devices communicating through communication network(s). Additionally, there may be more or fewer network traffic manager apparatus 24 or instances of various NFs in different configurations than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples also may be embodied as one or more non-transitory computer readable media having instructions stored thereon, such as in the memory of the network traffic manager apparatus 24, for one or more aspects of the present technology, as described and illustrated by way of the examples herein. The instructions in some examples include executable code that, when executed by one or more processors, such as the processor(s) of the network traffic manager apparatus 24 may cause the processors to carry out steps necessary to implement the methods of the examples of this technology that are described and illustrated herein.

An exemplary method of providing protection of a 5G core network will be described with reference to FIGS. 1-4. Referring more specifically to FIG. 4, a flow diagram of an example method 400 of providing protection of 5G core networks is illustrated. As described in detail above, the gNodeB 22 communicates with the UPF 12 via a tunnel interface N3. The gNodeB 22 can send random messages through the tunnel interface N3 with different TEIDs in an attempt to elicit a legitimate message from the UPF 12.

To protect the network from such an attack, in step 405 in this example, the network traffic manager apparatus 24 may receive a user plane status from a network repository function indicating whether a user plane 12 restarted. The user plane status may be received from the network repository function after the network traffic manager apparatus 24 registers to the network repository function with a Nnrf interface for the user plane status. The network traffic manager apparatus 24 checks whether the user plane 12 restarted because if the user plane 12 has restarted, even legitimate traffic will trigger error messages from the gNodeB 22. Thus, the network traffic manager apparatus 24 can verify if received error messages from the gNodeB 22 are accurate by checking the user plane status from the network repository function.

In step 410, the network traffic manager apparatus 24 may then determine whether an amount of error messages flowing from the user plane 12 to a gNodeB 22 for a source at rouge gNodeB 22 exceeds a predetermined threshold. As mentioned in step 405, a malicious user at rouge gNodeB 22 sends random messages to the gNodeB 22. When the amount of error messages flowing from the user plane 12 to the gNodeB 22 exceeds the predetermined threshold, this can be an indicator that the malicious user is sending requests at rouge gNodeB 22. Considering the network traffic manager apparatus 24 already verified at step 405 that the error messages from the gNodeB 22 are accurate and not a result of the user plane 12 restarting, then a likelihood of the user being malicious at rouge gNodeB 22 is high when the amount of error messages exceeds the predetermined threshold.

In step 415, the network traffic manager apparatus 24 may, in response to determining the amount of error messages exceeds a predetermined threshold and determining that the user plane 12 was not restarted, block all messages flowing to the gNodeB 22 for the source, wherein the messages comprise error messages and legitimate messages. By blocking all messages flowing to the gNodeB 22, the network traffic manager apparatus 24 is able to prevent a malicious user at rouge gNodeB 22 from accidently triggering a legitimate response from the gNodeB 22, granting the malicious user at rouge gNodeB 22 access to the mobile network 10. When the network traffic manager apparatus 24 determines the amount of error messages exceeds the predetermined threshold and determines that the user plane 12 was not restarted, the network traffic manager apparatus 24 may also store the source at rouge gNodeB 22 as a gray list actor to ensure future responses from the gNodeB 22 is blocked from being sent to the user equipment 16. The network traffic manager apparatus 24 may continue to block all messages to the gNodeB 22 from the user plane 12 for the source at rouge gNodeB 22 until the source at rouge gNodeB 22 is removed as a gray list actor. By blocking all messages to the gNodeB 22 for the source at rouge gNodeB 22, TEID detection becomes difficult for a malicious user at the user equipment 16.

In step 420, the network traffic manager apparatus 24 may then determine an amount of echo messages flowing from the user plane 12 to a gNodeB 22 and whether the user plane 12 restarted. If the amount of echo messages is zero and the user plane 12 has not restarted (meaning legitimate traffic is receiving accurate responses), then the lack of echo messages indicates that the gNodeB 22 has no active connections on the user plane 12. When there are no acting connections, the likelihood of that the user at the user equipment 16 sending messages to the gNodeB 22 is a malicious actor is high.

Thus, in step 425, the network traffic manager apparatus 24 may, in response to determining the amount of echo messages from the user plane 12 to the gNodeB 22 is below a second predetermined threshold and that the user plane 12 did not restart, store the source as a bad actor to prevent future attacks. The network traffic manager apparatus 24 may program FPGA to drop all packets from stored bad actors, which can be labeled as block-listed actors. The user at rouge gNodeB 22 may remain stored as the bad actor for a stipulated time until the attack is mitigated.

In step 430, the network traffic manager apparatus 24 may, in response to determining the amount of echo messages from the user plane 12 to the gNodeB 22 is above the second predetermined threshold, determine whether an updated amount of error messages flowing from the user plane 12 to the gNodeB 22 for a source is less than a previous amount of error messages, wherein the previous amount of error messages is the amount of error messages. When the amount of echo messages from the user plane 12 is above the second predetermined threshold or is not equal to zero, the likelihood of the user at rouge gNodeB 22 is malicious is medium. If the network traffic manager apparatus 24 determines that a rate of error messages is reducing, the network traffic manager apparatus 24 may determine that the source at rouge gNodeB 22 is not a malicious actor and remove the source at rouge gNodeB 22 as the grey list actor stored in memory.

In step 435, the network traffic manager apparatus 24 may, in response to determining that the updated amount of error messages flowing from the user plane 12 to the gNodeB 22 for the source is less than the previous amount of error messages, unblock all the messages from flowing to the gNodeB 22 for the source and end the exemplary process.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method implemented by a network traffic management system comprising one or more network traffic management devices and network functions (NFs), the method comprising:

receiving a user plane status from a network repository function indicating whether a user plane restarted;

determining whether an amount of error messages flowing from the user plane to a gNodeB for a source exceeds a predetermined threshold;

in response to determining the amount of error messages exceeds a predetermined threshold and determining that the user plane was not restarted, blocking all messages flowing to the gNodeB for the source, wherein the messages comprise error messages and legitimate messages;

determining an amount of echo messages flowing from the user plane to a gNodeB and whether the user plane restarted; and in response to determining the amount of echo messages from the user plane to the gNodeB is below a second predetermined threshold and that the user plane did not restart, storing the source as a bad actor.

2. The method of claim 1, wherein the messages are not blocked from flowing to the gNodeB for the source in response to determining that the amount of error messages does not exceed a predetermined threshold or determining that the user plane was restarted.

3. The method of claim 1, further comprising:

in response to determining the amount of echo messages from the user plane to the gNodeB is above the second predetermined threshold, determining whether an updated amount of error messages flowing from the user plane to the gNodeB for a source is less than a previous amount of error messages, wherein the previous amount of error messages is the amount of error messages; and in response to determining that the updated amount of error messages flowing from the user plane to the gNodeB for the source is less than the previous amount of error messages, unblocking all the messages from flowing to the gNodeB for the source.

4. The method of claim 3, wherein all the messages flowing to the gNodeB for the source continue to be blocked in response to determining that the updated amount of error messages flowing from the user plane to the gNodeB for the source is equal to or greater than the previous amount of error messages.

5. The method of claim 1, wherein when the amount of error messages exceeds the predetermined threshold, the source is stored as a grey list actor, and wherein the messages to the source continue to be blocked until the source is not stored as the grey list actor.

6. A network traffic management device, comprising memory comprising programmed instructions stored thereon and one or more processors configured to be capable of executing the stored programmed instructions to:

receive a user plane status from a network repository function indicating whether a user plane restarted;

determine whether an amount of error messages flowing from the user plane to a gNodeB for a source exceeds a predetermined threshold;

in response to determining the amount of error messages exceeds a predetermined threshold and determining that the user plane was not restarted, block all messages flowing to the gNodeB for the source, wherein the messages comprise error messages and legitimate messages;

determine an amount of echo messages flowing from the user plane to a gNodeB and whether the user plane restarted; and in response to determining the amount of echo messages from the user plane to the gNodeB is below a second predetermined threshold and that the user plane did not restart, store the source as a bad actor.

7. The device of claim 6, wherein the messages are not blocked from flowing to the gNodeB for the source in response to determining that the amount of error messages does not exceed a predetermined threshold or determining that the user plane was restarted.

8. The device of claim 6, wherein the one or more processors are further configured to be capable of executing the stored programmed instructions to:

in response to determining the amount of echo messages from the user plane to the gNodeB is above the second predetermined threshold, determine whether an updated amount of error messages flowing from the user plane to the gNodeB for a source is less than a previous amount of error messages, wherein the previous amount of error messages is the amount of error messages; and in response to determining that the updated amount of error messages flowing from the user plane to the gNodeB for the source is less than the previous amount of error messages, unblock all the messages from flowing to the gNodeB for the source.

9. The device of claim 8, wherein all the messages flowing to the gNodeB for the source continue to be blocked in response to determining that the updated amount of error messages flowing from the user plane to the gNodeB for the source is equal to or greater than the previous amount of error messages.

10. The device of claim 6, wherein when the amount of error messages exceeds the predetermined threshold, the source is stored as a grey list actor, and wherein the messages to the source continue to be blocked until the source is not stored as the grey list actor.

11. A non-transitory computer readable medium having stored thereon instructions comprising executable code that, when executed by one or more processors, causes the one or more processors to:

receive a user plane status from a network repository function indicating whether a user plane restarted;

determine whether an amount of error messages flowing from the user plane to a gNodeB for a source exceeds a predetermined threshold;

in response to determining the amount of error messages exceeds a predetermined threshold and determining that the user plane was not restarted, block all messages flowing to the gNodeB for the source, wherein the messages comprise error messages and legitimate messages;

determine an amount of echo messages flowing from the user plane to a gNodeB and whether the user plane restarted; and in response to determining the amount of echo messages from the user plane to the gNodeB is below a second predetermined threshold and that the user plane did not restart, store the source as a bad actor.

12. The non-transitory computer readable medium of claim 11, wherein the messages are not blocked from flowing to the gNodeB for the source in response to determining that the amount of error messages does not exceed a predetermined threshold or determining that the user plane was restarted.

13. The non-transitory computer readable medium of claim 11, comprising further instructions that, when executed by the one or more processors, causes the one or more processors to:

in response to determining the amount of echo messages from the user plane to the gNodeB is above the second predetermined threshold, determine whether an updated amount of error messages flowing from the user plane to the gNodeB for a source is less than a previous amount of error messages, wherein the previous amount of error messages is the amount of error messages; and in response to determining that the updated amount of error messages flowing from the user plane to the gNodeB for the source is less than the previous amount of error messages, unblock all the messages from flowing to the gNodeB for the source.

14. The non-transitory computer readable medium of claim 13, wherein all the messages flowing to the gNodeB for the source continue to be blocked in response to determining that the updated amount of error messages flowing from the user plane to the gNodeB for the source is equal to or greater than the previous amount of error messages.

15. The non-transitory computer readable medium of claim 11, wherein when the amount of error messages exceeds the predetermined threshold, the source is stored as a grey list actor, and wherein the messages to the source continue to be blocked until the source is not stored as the grey list actor.

16. A network traffic management system, comprising one or more network traffic management devices and network functions (NFs) with memory comprising programmed instructions stored thereon and one or more processors configured to be capable of executing the stored programmed instructions to:

receive a user plane status from a network repository function indicating whether a user plane restarted;

determine whether an amount of error messages flowing from the user plane to a gNodeB for a source exceeds a predetermined threshold;

in response to determining the amount of error messages exceeds a predetermined threshold and determining that the user plane was not restarted, block all messages flowing to the gNodeB for the source, wherein the messages comprise error messages and legitimate messages;

determine an amount of echo messages flowing from the user plane to a gNodeB and whether the user plane restarted; and in response to determining the amount of echo messages from the user plane to the gNodeB is below a second predetermined threshold and that the user plane did not restart, store the source as a bad actor.

17. The system of claim 16, wherein the messages are not blocked from flowing to the gNodeB for the source in response to determining that the amount of error messages does not exceed a predetermined threshold or determining that the user plane was restarted.

18. The system of claim 16, wherein the one or more processors are further configured to be capable of executing the stored programmed instructions to:

in response to determining the amount of echo messages from the user plane to the gNodeB is above the second predetermined threshold, determine whether an updated amount of error messages flowing from the user plane to the gNodeB for a source is less than a previous amount of error messages, wherein the previous amount of error messages is the amount of error messages; and in response to determining that the updated amount of error messages flowing from the user plane to the gNodeB for the source is less than the previous amount of error messages, unblock all the messages from flowing to the gNodeB for the source.

19. The system of claim 18, wherein all the messages flowing to the gNodeB for the source continue to be blocked in response to determining that the updated amount of error messages flowing from the user plane to the gNodeB for the source is equal to or greater than the previous amount of error messages.

20. The system of claim 16, wherein when the amount of error messages exceeds the predetermined threshold, the source is stored as a grey list actor, and wherein the messages to the source continue to be blocked until the source is not stored as the grey list actor.

\* \* \* \* \*